UNITED STATES PATENT OFFICE.

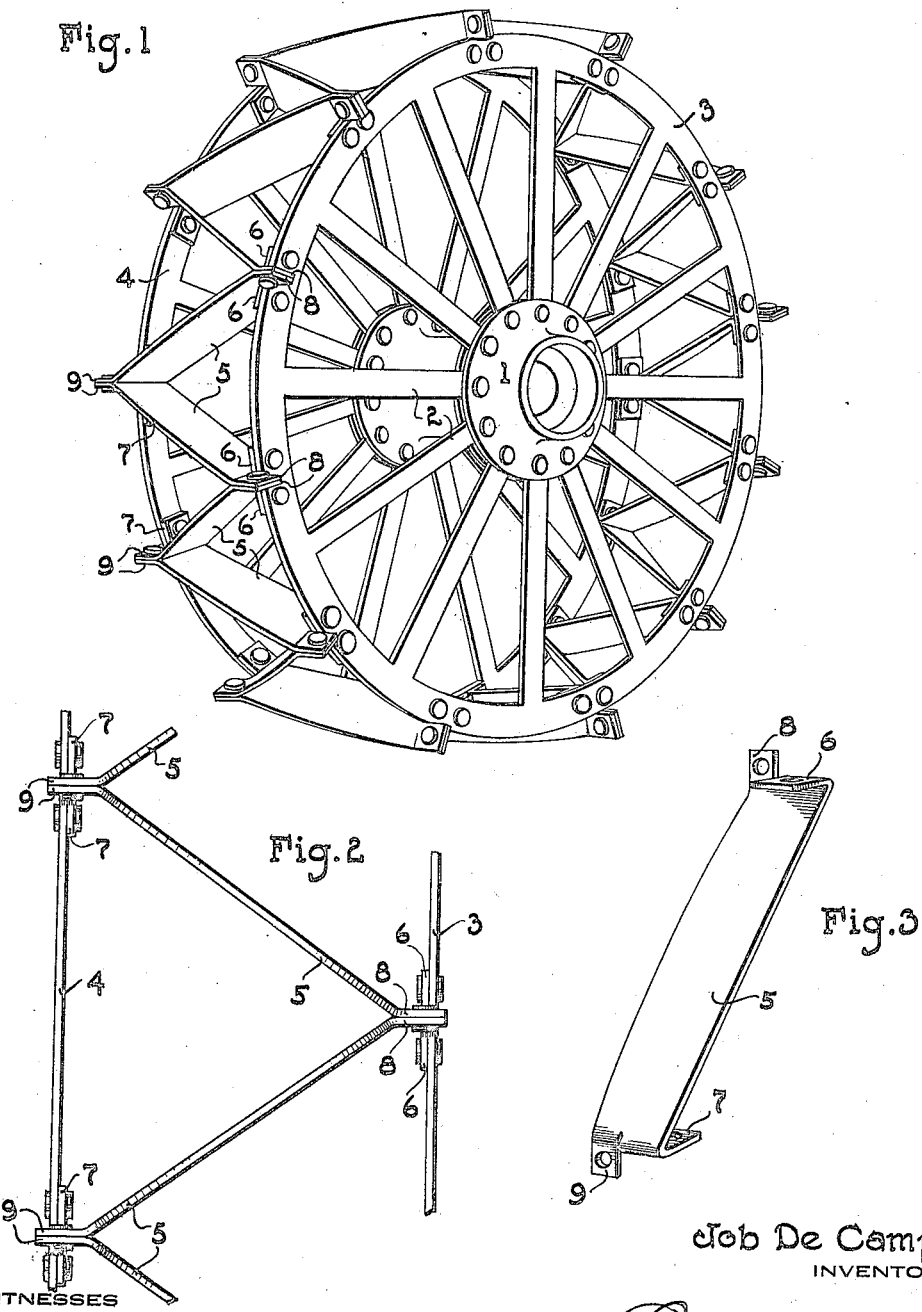

JOB DE CAMP, OF VAN WERT COUNTY, NEAR GROVER HILL, OHIO.

FARM-TRACTOR WHEEL.

1,427,095.    Specification of Letters Patent.    Patented Aug. 29, 1922.

Application filed October 17, 1921. Serial No. 508,225.

*To all whom it may concern:*

Be it known that I, JOB DE CAMP, a citizen of the United States, residing in Van Wert County, near Grover Hill, State of Ohio, have invented a new and useful Farm-Tractor Wheel, of which the following is a specification.

This invention relates to wheels, and is more particularly concerned with traction wheels for light farm tractors, harvesters and the like.

An object of this invention is to provide a new and improved wheel construction which is simple, light and durable, while possessing a maximum traction with a minimum amount of material.

Another object of the invention is the provision of a self-cleaning tread in which there is little or no possibility of the same being clogged by debris.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a perspective view of the traction wheel disclosing my improved tread.

Fig. 2 is a fragmentary plan view of the tread disclosing the details of the connections forming the tread.

Fig. 3 is a detached view in perspective of a bar which forms part of the tread.

Referring to the drawing, 1 designates the hub, to which is secured the ribs or spokes 2 in any approved manner, supporting upon their outer ends the annular spaced flat rings 3 and 4. I have shown the spokes as integrally formed with the rings; but in practice it may be preferable to have the same separate and distinct from the spokes, but this forms no part of my invention.

The tread portion of the wheel comprises a series of diagonally disposed bars 5 connected to each other and to points upon the opposite inner faces of the rings. As shown in Fig. 3, the end of each bar is split longitudinally for a portion of its length to provide lugs 6, 8 and 7, 9. Lugs 6 and 7 are perforated and bent at an acute angle towards opposite faces of the bar. Lugs 8 and 9 are perforated and bent at an obtuse angle towards opposite faces and in the same direction as the lugs 6 and 7, respectively, lugs 8 and 9 forming a right angle with lugs 6 and 7, respectively. The lugs 8 and 9 project outwardly from the ends of the bar and beyond the plane of lugs 6 and 7, and overhang the rings 3 and are supported thereon.

The angularity of the lugs 6 and 7 is such that they will lie flush upon the opposite inner faces of the rings 3 and 4, and thereby cause the bars 5 to extend diagonally between the faces. The angular disposition of the lugs 8 and 9 is such, with respect to the faces of the bars, that said lugs will coincide with similarly placed lugs upon the meeting ends of adjacent bars. The lugs 8, 8 and 9, 9 of consecutively placed bars are riveted together, and because of the angular positions of these lugs, there will be formed between the rings a web of diagonally disposed bars connected together. Lugs 6, 6 and 7, 7 extending at right angles respectively to the lugs 8, 8 and 9, 9 are connected to the opposite faces of the rings forming the tread of the wheel.

Should any of the bars 5 show signs of wear, they may be readily replaced by removing the rivets that connect them with adjacent bars and with the annular rings 3 and 4. The bars are made in one piece and cut as blanks from bar iron of the proper dimensions. The ends are then split and bent at the proper angles to form the connecting lugs.

The spokes and rim may be distinct parts instead of being integrally formed as shown in Fig. 1, so that it may be possible to ship all the parts packed in small bundles requiring a minimum of space when they may be readily assembled at the distributing points. The tread lends itself readily to such a purpose by reason of its knockdown construction, since it is composed wholly of the bars 5 riveted together.

The angular disposition of the lugs determines the position of the bars and greatly facilitates the assembly of the wheel.

The wheel is light because it is open, and the fact that less material is required in its construction. The cross bars and the rings being formed of plain flat bar iron set edgewise having no flanges leaves a minimum packing surface thus enabling the wheel to clean itself.

The bars 5, which may be referred to as cleats, extend beyond the outer circumference of the rings by reason of the fact that the ends of the bars are supported upon said rings.

The cleats or cross bars 5 have their outer edge or traction surface curved along the arc of a circle so that as the wheel passes over hard roads or pavements, it will not jolt the vehicle, since but a portion of the surface of the wheel will engage the road at a time.

What is claimed is:—

1. In a traction wheel, the combination of a hub, a tread portion, and connecting means between the hub and tread portion, said tread portion comprising a pair of spaced annular rings, and diagonally-disposed bars provided with lugs extending outwardly from the ends of said bars, the lugs of adjacent bars being connected together, other lugs located below and extending in opposite directions from the first-mentioned lugs upon opposite sides of the bars and connected with the annular rings, the first-mentioned lugs extending beyond the second-mentioned lugs and supported upon the peripheries of the annular rings.

2. In a traction wheel, the combination of a hub, a tread portion, and connecting means between the hub and tread portion, said tread portion comprising a pair of spaced annular rings formed of flat metal set edgewise, and a plurality of straight diagonally-disposed bars provided with a pair of projecting lugs on each end of each bar and inclined at different angles, certain of the lugs of adjacent bars being connected together and overhanging said rings, while others of the lugs are secured to the side faces of the annular rings.

3. In a traction wheel, the combination with a hub, of spokes, a pair of spaced annular rings, a plurality of straight diagonally disposed bars arranged between and supported at their ends upon the rings so that the outer transverse edge of the bars extend beyond the peripheral edge of said rings with a portion of each bar projecting above the rings, and means for securing the ends of the bars to the rings.

4. In a traction wheel, the combination with the hub, of spokes, a pair of spaced annular rings, a plurality of diagonally-disposed bars arranged between the rings, said bars having their ends split so that they rest upon and overhang the outer peripheral edges of the rings, means for securing the overhanging edges of adjacent bars to each other, and other means for securing the ends of the bars to the rings.

In testimony that I claim the foregoing as my own, I have hereto affixed my signature.

JOB DE CAMP.